Feb. 11, 1930. J. R. FRY ET AL 1,746,827
RETARDED ACTION CIRCUIT CONTROLLER
Filed June 7, 1927
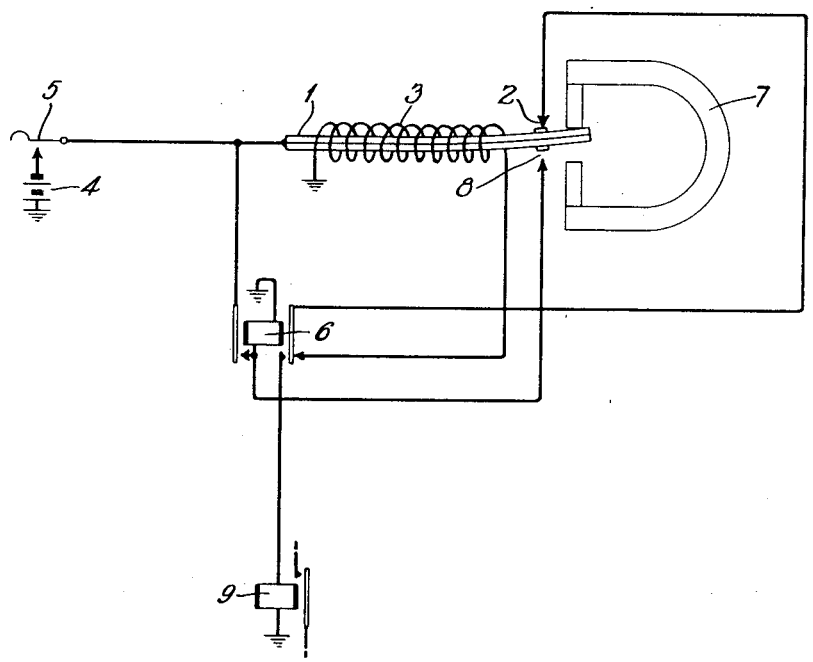
INVENTORS JACOB R. FRY
RALPH E. HANTZSCH
BY
ATTORNEY Patented Feb. 11, 1930

1,746,827

UNITED STATES PATENT OFFICE

JACOB R. FRY, OF MONTCLAIR, AND RALPH E. HANTZSCH, OF EAST ORANGE, NEW JERSEY, ASSIGNORS TO WESTERN ELECTRIC COMPANY, INCORPORATED, OF NEW YORK, N. Y., A CORPORATION OF NEW YORK

RETARDED-ACTION CIRCUIT CONTROLLER

Application filed June 7, 1927. Serial No. 197,172.

This invention relates to retarded action circuit controllers, and more particularly to a circuit controller arrangement having a time lag in its operation introduced by means of a thermostatic device.

One difficulty that has been experienced in the use of electro-thermal devices for delay circuits, where it is desired that the delay period be substantially uniform for successive operations, has been due to the fact that the voltage of the operating supply source often varies sufficiently to cause a considerable variation in the successive operating times of the thermal device.

Another difficulty has been that the thermal element of such device frequently does not have sufficient time to completely cool down to the temperature of the surrounding air before it is again heated, thereby obviously shortening the next operating period correspondingly.

Upon investigation, it has been determined that whereas the heating period of such devices is subject to considerable variation due to normal fluctuations in the heating current, the cooling time is practically independent of any disturbing influence commonly met with in practice, particularly in locations where the temperature of the surrounding air is maintained within normal limits, as, for example, in telephone exchange buildings, etc. By making the heating period of such devices comparatively short with respect to the cooling period, it has been found that the time variation in successive operating cycles may be reduced so as to be practically negligible.

An object of the present invention is to employ the combined heating and cooling times of a thermostatic device to introduce a substantially uniform time lag in delay circuits.

In attaining the foregoing object the invention resides in a delay circuit arrangement employing a thermostatic device having means responsive to the operation of the device to prepare a path to change the condition of the delay circuit when the device returns to its normal position.

The invention will be understood from the following description of one embodiment thereof, when read in connection with the accompanying drawing, in which a thermal element or reed 1 is adapted to be bent away from its normal contacts 2 when heated to a predetermined temperature by current supplied by battery 4, flowing in the heating coil 3, the circuit for which includes the key or other contacting device 5, contacts 2 of reed 1, contacts of relay 6 and heating coil 3 to ground. In practice, a permanent magnet 7 is desirable for the purpose of imparting a final quick action to the reed in one direction or the other to cause its operated or normal contacts to close positively after the reed has moved a certain predetermined distance either under the influence of the heating current or when it is cooling.

The operation of the circuit is as follows: When the key 5 is closed, current in the previously traced circuit flows through heating coil 3 to cause the heating of reed 1. When a certain predetermined temperature is reached reed 1 will be bent out of its normal position and break its contacts 2, and under the assisting influence of the permanent magnet 7, it will snap into its operated position and close its contacts 8, thereby completing an obvious circuit for the operation of relay 6. Relay 6 in operating closes at its left hand contacts a locking circuit for itself under control of the key 5 and at its right hand operated contacts prepares a circuit for the operation of relay 9, which circuit, however is at this time open at contacts 2 of reed 1. The heating period of the device is now completed and as the circuit for coil 3 is open at contacts 2 and also at the back contacts of relay 6 the reed 1 now starts to cool, which as before stated it does at a substantially uniform rate independent of any disturbing influence, provided ordinary precautions are taken to protect it from excessive temperature changes.

When the reed 1 has cooled down to the proper temperature it snaps back, with the assistance of the permanent magnet 7, and again closes its normal contacts 2, thereby closing the prepared circuit for relay 9 and causing this relay to operate from battery 4, which circuit may be traced through the contacts of key 5, contacts 2 of reed 1, right hand closed contacts of relay 6 and winding of relay 9 to ground. Relay 9 may be the device whose operating time it is desired to retard or this relay may in turn control other circuits.

The present invention may be embodied in many other forms than the one described and we do not wish to be restricted to the precise form shown. The appended claims are intended to cover any and all changes or modification thereof within the spirit and scope of our invention.

What is claimed is:

1. In an electrical switching system, a circuit whose condition it is desired to change, a thermostatic device, means for generating heat and for applying it to said device to cause the operation of said device, means responsive to the operation thereof for discontinuing said generation of heat and for preparing said circuit for its change in condition, and means responsive to the return of said device to normal to change the condition of said circuit.

2. In a delay circuit, a circuit to be controlled, a thermostatic device, means responsive to the operation of said device to prepare said circuit for control, and means effective upon the release of said device to control said circuit.

3. In an electrical switching system, a circuit to be controlled, a thermostatic device, a source of current, means to cause said current to heat the device to cause its operation, means responsive to the operation of said device to disconnect said heating current and to condition said circuit for control, and means effective upon the release of said device to effect the control of said circuit.

4. In an electrical switching system, a circuit to be closed, a thermostatic switch arranged when actuated to cause the partial closure of said circuit and to complete said circuit when said switch is returned to normal.

5. In an electrical switching system, a circuit normally open at two points, a thermostatic switch arranged when actuated to close one of said circuit openings and to close the second opening when the switch is returned to normal.

6. In an electrical switching system, a circuit normally open at two points, a thermostatic switch arranged when actuated to close one of said circuit openings and to close the second opening when the switch is returned to normal, and means for automatically maintaining said first opening closed after the restoration of said switch.

In witness whereof, I hereunto subscribe my name this 26th day of May, A. D. 1927.

JACOB R. FRY.

Signed this 4th day of June, A. D. 1927.

RALPH E. HANTZSCH.